United States Patent
Mölne et al.

(10) Patent No.: US 8,026,906 B2
(45) Date of Patent: Sep. 27, 2011

(54) INTEGRATED FORCE SENSITIVE LENS AND SOFTWARE

(75) Inventors: Anders L Mölne, Cary, NC (US); Joseph Carsanaro, Chapel Hill, NC (US); Toni Leinonen, Oulu (FI); Konstantin Klimov, Vladivostok (RU)

(73) Assignee: F-Origin, Inc., Morrisville, NC (US)

( * ) Notice: Subject to any disclaimer, the term of this patent is extended or adjusted under 35 U.S.C. 154(b) by 825 days.

(21) Appl. No.: 12/009,964

(22) Filed: Jan. 23, 2008

(65) Prior Publication Data

US 2009/0066673 A1   Mar. 12, 2009

Related U.S. Application Data

(63) Continuation-in-part of application No. PCT/US2007/019606, filed on Sep. 7, 2007.

(51) Int. Cl.
*G09G 5/00* (2006.01)
(52) U.S. Cl. ............... 345/174; 702/86; 345/178
(58) Field of Classification Search .......... 345/174, 345/178; 702/86
See application file for complete search history.

(56) References Cited

U.S. PATENT DOCUMENTS 5,440,237 A * 8/1995 Brown et al. ............ 324/601
2006/0284856 A1* 12/2006 Soss ....................... 345/173

* cited by examiner

*Primary Examiner* — Quan-Zhen Wang
*Assistant Examiner* — Tom Sheng
(74) *Attorney, Agent, or Firm* — Ober, Kaler, Grimes & Shriver; Royal W. Craig

(57) ABSTRACT

A software compensation method that allows a touch sensitive display to be built using low-cost FSR force sensors The compensation method comprises an array of functional compensation modules including filtering, voltage conversion, temperature compensation, humidity compensation, sensor calibration, sensor reading linearization, auto calibration, positioning determination and finally end-user and mechanical calibration. The array of compensation modules can bring system accuracy from a non-compensated average positioning error in the 25% to 50% range, down to aN end-user acceptable range of 0% to 5%. The increased positioning accuracy makes it possible to use FSRs as opposed to traditional piezoresistive based touch screen sensors.

20 Claims, 10 Drawing Sheets

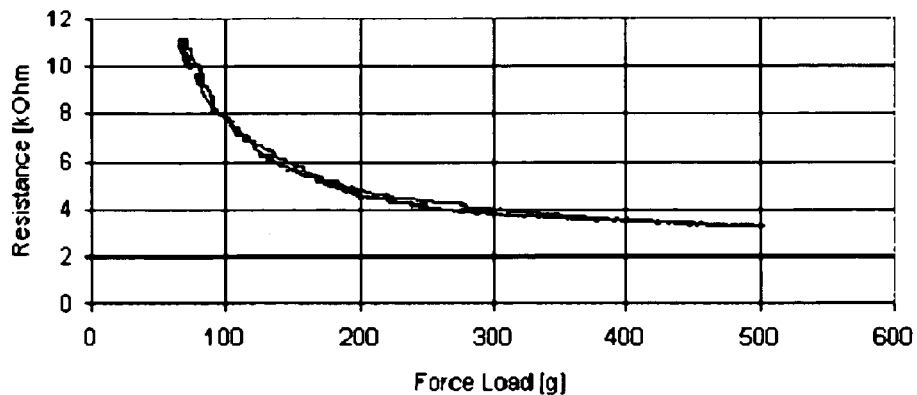
FIG. 3
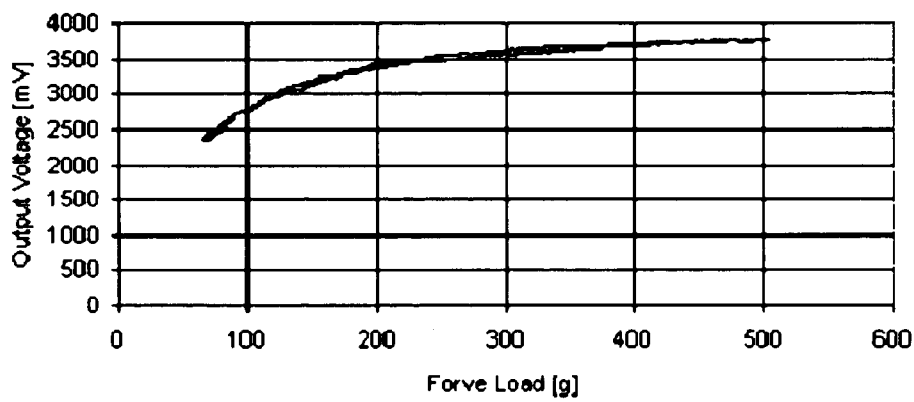
FIG. 4
| Sensitivities | | at delta load | nominal res between | | | percentage change of nom res/gram |
|---|---|---|---|---|---|---|
| | at 80 g | at 500 g | 420 g | 80 g to 500 g | delta R/mean R | x100% |
| | res [kOhm] | res [kOhm] | delta R [kOhm] | mean R [kOhm] | | | %/g |
| A1 | 49.15 | 12.93 | -36.22 | 31.04 | -1.166,881,443 | -116,688 | -0.277828915 |
| A2 | 35.3 | 12.55 | -22.75 | 23.925 | -0.950888192 | -950,888 | -0.226401951 |
| A3 | 21.76 | 7.72 | -14.04 | 14.74 | -0.952510176 | -95,251 | -0.226788137 |
| A4 | 32.72 | 8.76 | -23.96 | 20.74 | -1,155,255,545 | -115,526 | -0.275060844 |
| A5 | 33.17 | 10.92 | -22.25 | 22.045 | -1,009,299,161 | -100,93 | -0.240309324 |
| A6 | 36.61 | 11.13 | -25.48 | 23.87 | -106,744,868 | -106,745 | -0.254154448 |
FIG. 5

| $x_1y_1$ | $x_2y_1$ | $x_3y_1$ | $x_4y_1$ | $x_5y_1$ |
|---|---|---|---|---|
| $x_1y_2$ | $x_2y_2$ | $x_3y_2$ | $x_4y_2$ | $x_5y_2$ |
| $x_1y_3$ | $x_2y_3$ | $x_3y_3$ | $x_4y_3$ | $x_5y_3$ |
| $x_1y_4$ | $x_2y_4$ | $x_3y_4$ | $x_4y_4$ | $x_5y_4$ |
| $x_1y_5$ | $x_2y_5$ | $x_3y_5$ | $x_4y_5$ | $x_5y_5$ |

INTEGRATED FORCE SENSITIVE LENS AND SOFTWARE

CROSS-REFERENCE TO RELATED APPLICATION(S)

The present application is a continuation-in-part of International application no PCT/US2007/019606 filed 7 Sep. 2007, which designates the United States.

BACKGROUND OF THE INVENTION (1) Field of the Invention

The present invention relates to input devices for electronics and, more particularly, to a touch sensitive input panel or display with small form factor especially suited for use in cellular phones and personal digital assistants (PDAs), PC Tablets, as well as laptops, PCs, office equipment, medical equipment, or any other device that uses touch sensitive displays or panels.

(2) Description of Prior Art

Touch screens are being deployed in an increasing number of products using an array of several types of technology. Market analysts predict that in the mobile telephony market, touch screens will increase from less then 10% penetration to more then 50% penetration by 2010, assuming the cost of these touch screens are reduced to a low enough level. It is possible that resistive based touch screens can support low enough prices, but it is certain that force sensing resistor based touch screen can be produced at low enough cost to support this type of market projections.

As consumer products continually decrease in size and increase in user interface complexity and display advancements, the demand for inexpensive, low-profile and precise touch screens is increasing. Indeed, when used in a smaller electronics device the sensor must also be thin, i.e., less than about 1 mm thickness, yet be robust and durable.

In today's electronic industry the manufacturer of an electronic device utilizing a pressure sensitive touch sensitive display solution will look to their display supplier and solution providers for new low cost highly functional touch screens.

There are several types of technologies used in implementing touch sensitive screens that can detect the application of fingers and other passive objects. For example, resistive pads comprise two conductive plates pressed together. The disadvantage of a resistive pad is that the resistive membrane material will wear out, initially resulting in further reduced clarity followed by dead spots. In addition, the production yield is typically rather poor and the technology has a few disadvantages such as a fixed (non-user adjustable) actuation force and the light throughput through the resistive membranes is typically only around 70% to 75%, reducing display visibility.

Capacitive touchpads operate by measuring the capacitance of the passive object to ground, or by measuring the alteration of the trans-capacitance between different sensors.

An example of a capacitive touchpad is described in U.S. Pat. No. 5,495,077 to Miller.

Capacitive pads are relatively expensive to manufacture compared to resistive, and can only detect objects with sufficient capacitance. Small objects, such as the end of a regular stylus or pen, do not have enough capacitance to ground or trans-capacitance to be detected by a capacitive touchpad. Moreover, the actuation force is predetermined and may be as low as 0 grams force, in which case the touch screen may register a touch even before the user's finger touches the screen. This often leads to difficulties in implementing certain end-user features, such as handwriting recognition.

Surface acoustic wave devices operate by emitting sound along the surface of the pad and measuring the interaction of the passive object with the sound. These devices work well, but are generally much too expensive for general applications.

Infra red light based displays work in a similar fashion, but this technology typically adds a large size and a high cost increase.

Finally, there are devices that use force sensors to measure the location and magnitude of the force exerted by the passive object on the touchpad. A force sensitive touchpad will sense force applied by any sort of passive object, regardless of the electrical conductivity or composition of the object. Such devices were originally described in U.S. Pat. No. 3,657,475 to Peronneau et al. and U.S. Pat. No. 4,121,049 to Roeber. These devices measure the forces transmitted by the touchpad to a fixed frame at multiple points e.g., at the corners of the pad. Roeber '049 discloses a mathematical formula for deriving the position and magnitude of the force applied by a passive object from the forces measured at the multiple points.

As another example, U.S. Pat. No. 4,511,760 to Garwin et al. issued Apr. 16, 1985 shows a force sensing data input device responding to the release of pressure force. The input surface is provided with a transparent faceplate mounted on force-sensing piezoelectric transducers. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum for the pushing direction. The individual outputs of the four sensors at the time that the peak of the sum occurs are used to calculate the point of application of the force.

United States Patent Application 20030085882 by Lu published May 8, 2003 shows a touch pad device having a support layer with a plurality of strain gauges in a matrix configuration. A touch layer is disposed on top of the strain gauge matrix, the touch layer being joined to the top of the strain gauge matrix. Sensor wires connect the strain gauges to a processor which is programmed with an algorithm to measure the location and pressure of simultaneous, multiple touches.

United States Patent Applications 20040108995 and 20040021643 both by Hoshino et al. show a display unit with touch panel mounted above a display via four differentially-mounted sensors. The pressure sensors detect force with which a pointing device such as a finger pushes the panel surface, in real time. The force P with which the pointing device such as a finger pushes the panel surface is found from the following equation irrespective of the pointing position: $P=a+b+c+d-a0+b0+c0+d0$, which equation detects dragging of a cursor.

United States Patent Application 20050156901 by Ma et al. issued Jul. 21, 2005 shows a touch screen display system with a display screen and overlying touch surface. An imaging system determines an angular position on the touch surface of the object coming in contact with the touch surface.

United States Patent Application 20060119589 by Rosenberg shows a haptic feedback feature for touchpads and other touch controls in which at least one actuator is coupled to the touch input device and outputs a force to provide a haptic sensation to the user contacting the touch surface. Output haptic sensations on the touch input device can include pulses, vibrations, and spatial textures, and the compliant suspension amplifies the haptic feedback.

United States Patent Application 20060016272 by Chang published Jan. 26, 2006 shows a thin film touch pad with opposed sensor elements that generate an electrical signal that is proportional to both the applied pressure and the surface area at the location of the applied pressure. As a result of the complementary orientation and overlapping for these sensor elements, the first and second sensor elements generate an asymmetric pair of signals that uniquely define the applied pressure by position and magnitude.

U.S. Pat. No. 6,879,318 by Chan et al. issued Apr. 12, 2005 shows a touch screen mounting assembly for a liquid crystal display panel LCD including a bottom frame, a backlight panel seated in the frame and that has a plurality of pressure-sensitive transducers mounted thereon, a liquid crystal display panel, and a top frame for exerting pressure when mounted to the bottom frame such that a plurality of compressible springs biases the LCD panel towards the bottom frame when touched or contacted by a user. The claims require the bottom and top frame assembly with backlight panel mounted therein on springs, and an overlying LCD panel.

Despite the availability of the existing sensing technologies mentioned herein, the prior art has been unable to provide a low-cost sensor assembly/solution having sufficient sensitivity, surface robustness, accuracy and form factor. Therefore, there is significant industrial applicability in the present invention which provides a force sensing technology which overcomes some of the deficiencies of the prior art.

A commercially viable force-based touch sensor for use with consumer equipment, such as computers, must be both inexpensive and precise. The precision required of such a device is the capability to sense both fingers and pens over a pressure range from about 1 gram to 500 grams or more, with a typical positional precision of +/−1 mm and a resolution of 400 dpi or more. When used in a smaller electronics device the sensor must also be thin, typically less than about 1 mm, and should also be capable of modular assembly for more-or-less "snap-in" construction. The force must in addition to be small and low cost, also be very durable. It needs to allow for millions of press-depress cycles as well as allow for high spikes in the applied force, such as if a device is dropped onto the floor, as well as allow for a wide temperature range, as wide as −40 C to +80 C, at least for storage.

FIG. 1 is a high level representation an electronic device 1, such as a PDA or a cellular phone, having a touch screen assembly 2. One skilled in the art should understand that the touch screen assembly 2 may be incorporated in cellular phones and personal digital assistants (PDAs), PC Tablets, as well as laptops, PCs, office equipment, medical equipment, or any other device that uses touch sensitive displays or panels.

The touch screen assembly 2 employs a touch surface comprising a pressure sensitive lens (PSL) 3 overtop (and preferably bonded to) an underlying LCD or OLED module 5. The PSL 3 covers the LCD/OLED module 5 and may additionally cover static keys on the keypad 4. It is noteworthy that the touch sensitivity area can be extended beyond the display module 5 display area. For example, in the example of FIG. 1 the PSL 3 also extends over a static printed keypad area 4. Regardless of whether a user presses a key in the static keypad area 4 or some portion of the LCD/OLED module 5 area, exactly the same behavior is triggered. The exact "touch-coordinate" is calculated, the touch coordinate is interpreted, and proper control signal(s) are generated. If, for example, the user presses a Left-Arrow Command key, the corresponding left arrow command is generated. As will be described, the touch screen assembly 2 may optionally be equipped with a haptic response generator 12 along with the sensors 7, such as a piezo element or a magnetic inductive coil. In this case whenever the PSL 3 is depressed a short vibration burst is generated by the haptic element 12 and the user can feel as if the "key" was pressed.

It is known to employ a mechanical differential-pressure touch screen system that uses a plurality of force sensors. For example, FIG. 1 is a high level representation an electronic device 1, such as a PDA or a cellular phone, having a touch screen assembly 2.

LCD/OLED module 5 has a plurality (such as, for example, four) differentially-mounted sensors 7 beneath it all connected to the electronic device 1 processor. This way, when a user touches the PSL 3, the touch pressure is transmitted through the LCD/OLED module 5 into the sensors 7 where it is registered, processed, the exact "touch-coordinate" is calculated, and the touch coordinate is interpreted and proper control signal(s) are generated. Within this core context, two basic mechanical embodiments may be used. In one embodiment the sensors are mounted beneath the display module itself. Most conventional display screens (LCD or otherwise) are reinforced with a bonded protective lens. This lens is typically a 0.70 mm to 1.2 mm treated glass, protecting the LCD against cracks, scratching and also providing anti-glare coating. The existing glass lens serves as the primary touch surface, and the force imparted to the primary touch surface is transmitted through the display module and is detected by the differentially-mounted pressure sensors beneath the display module. Alternately, a separate free-floating lens may be used overtop the display module (independently suspended there over). The free floating lens straddles the display module and bears directly against the differentially-mounted pressure sensors.

Examples of both configurations are disclosed in International application no PCT/US2007/019606 filed 7 Sep. 2007. The touch sensitive lens may have some form of mechanical suspension, such as metal beams that suspend the lens and allow for a minor but unrestricted motion in the z-plane with a minimum or no motion in the xy-plane. There are typically four piezo-resistive force sensors in each corner that the floating lens rests on. In order to optimize performance, there may be a pre-loading of the lens through gasket or springs, that presses the lens down onto the force sensors with a preload weight typically greater then the weight of the lens itself. The piezo-resistive sensors are electrically connected via an amplifier to an analog to digital converter (ADC), typically one ADC with enough channels to support the number of sensors. The ADC is then connected via a digital bus, such as I2C or SPI to a microcontroller or an application processor running positioning determination software. The software triangulates the force readings from the force sensors to determine the actual coordinate where the touch force was applied. The software transfers the calculated coordinates to the device's operating system.

Presently most commercial force sensors use piezoresistive materials to detect applied force. While most commercially available piezoresistive force sensors are highly accurate, they typically are not very durable and are large and expensive with only a few available component suppliers globally. There are alternative force sensors available, such as "force sensitive resistors" or FSR's, which are smaller, lower in cost and more readily available. Examples of FSRs are shown in U.S. Pat. Nos. 4,739,299, 4,489,302, 4,451,714, 4,315,238, 4,314,228, 4,314,227 and 4,306,480. A benefit of using integrated FSR sensors is that the voltage output is typically ten times higher then the voltage output for a piezoresistive force sensor. This higher voltage output eliminates the need for additional analog signal amplification, thereby further reducing both required board space as well as component costs. The mechanical design is further simplified by use of the FSR sensor since these sensors do not need to be protected against overpressure, whereas a typical piezo resistive sensor does. Unfortunately FSR sensors have a much narrower range of sensitivity. In addition, there are also new, not yet commercialized, force sensor materials that are based on nano technology. The early indications from activities in this area are that the nano technology based sensors will be similar to FSR sensors in terms of low per unit cost, small size, yet will require similar added performance compensation and error correction.

Two embodiments of FSR sensors are represented in FIG. 2. These sensors are typically made up of two plans of conductive materials 24 in sensor 20 or conductive traces in sensor 21 that are "connected" through FSR material. The characteristics of the FSR material are that it remains non-conductive until a force is applied. When a force is applied, the resistance in the material decreases as the applied force increases.

An example of such resistance-force relationship for a FSR sensor is illustrated in FIG. 3. The nature of this resistance-force relationship can be controlled through the design of the FSR material and the sensor, so that the sensor may have its sensitivity optimized for a specific force range. As seen in FIG. 3 the sensor produces a useless result for forces less then 70 grams, but has a very high sensitivity up to 200 grams. The sensitivity is reduced, but still significant in the 200 to 450 gram range, where the resistance level begins to flatten towards 3 kOhm.

Referring back to FIG. 2, also illustrated (at right) is a typical electrical connection, where an FSR sensor is typically connected as seen at 22 with a matching pull-down resistor, here a 3 kOhm resister. The sensor reading, Vout, is a function of the supply voltage, Vdc, and the resistance of the FSR sensor at a given applied force. This relationship is illustrated in FIG. 4, were it is demonstrated how the sensor reading (Vout) is increasing as the resistance in the FSR material decreases with the increase in the applied force. It should be noted that the force-Vout relationship would be very different for a piezo resistive sensor, where the relationship is linear from 0 gram force up through its operating range.

FIG. 5 illustrates the performance difference between different sample FSR sensors with the same design. It can be seen from FIG. 5 that the individual resistance value of one sensor sample differs significantly compared to a second sample, even within the same production batch. A third characteristic of the typical FSR sensor is that they are, unlike the Wheatstone bridge based piezo resistive force sensors, temperature dependent.

FIG. 6 illustrates how the resistance—force relationship changes for the same sensor measured under identical conditions, but at different temperature levels. These above-described characteristics make it difficult to design a differential-pressure touch pad assembly based on FSR technology. Nevertheless, the present inventors have devised a software compensation approach that allows the use of small and low-cost force sensing sensors, such as FSR sensors.

It would, therefore, be greatly advantageous to provide a force sensing technology which overcomes some of the above deficiencies of the prior art.

SUMMARY OF THE INVENTION

Accordingly, it is an object of the present invention to optimize an alternative force sensor technology in order to provide a low-cost pressure sensitive touch sensitive display solution suitable for manufacturers of electronic devices such as POS, ATMs and terminals and, specifically, portable electronic devices such as cell phones, cameras and PDA and other mobile computing devices.

This and other objects are accomplished herein by a force sensing resistor able to serve as a replacement for the high performing piezo resistive force sensors. In order to replace the piezo resistive force sensor, the present force sensing resistor is supported by software that includes compensation and calibration algorithms and modules.

The force sensing resistor based touch screen assembly generally comprises either a floating lens suspended over the display, or as an alternative a floating display module. The floating lens, or floating display module, rests on or includes a plurality (n=3 . . . m) of differentially-mounted force sensing resistors. The pressure sensors are differentially positioned along an x- and y-axis for registering a pressure z from a touch to the lens at each of the positions, to provide a corresponding plurality of data sets (x1-m, y1-m, z1-m). The sensors are then electrically connected through basic electronic components on flex film or PCB via an A/D converter, where the analog sensor reading is converted to a digital signal, to either a dedicated processing unit (such as a microcontroller) or the main processor where the touch screen related software is executed.

This control software provides the precision and accuracy of the system through a number of functional modules, including filtering, voltage conversion, sensor calibration, sensor reading linearization, auto calibration, positioning determination and finally end-user and mechanical calibration.

The positioning determination of a force sensing resistor based touch screen, without any additional compensation or calibration, is typically running with an average positioning error of 20%-50%, which would more or less render such system useless. The added compensation and calibration algorithms will bring the system accuracy up to an average positioning error between 0 and 5%, depending on size, electrical components and mechanical design, which is on par with a piezo resistive based touch screen system.

Other variations and advantages are described in the detailed description below.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 3 is an exemplary plot of the resistance-force relationship for an FSR sensor as illustrated in FIG. 2.

FIG. 4 is a plot illustrating the FSR sensor reading (Vout) as a function of the resistance in the FSR material.

FIG. 5 is a plot illustrating the performance difference between different sample FSR sensors with the same design.

DETAILED DESCRIPTION OF THE PREFERRED EMBODIMENTS

Figure 1:
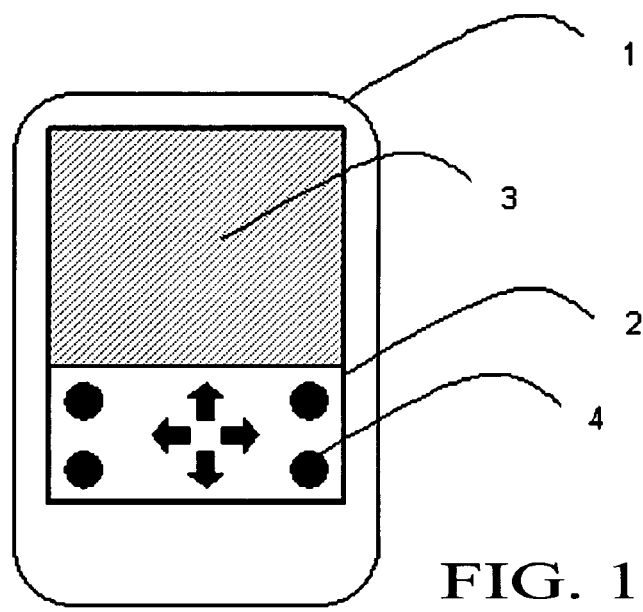
FIG. 1 is a high level representation an electronic device 1, such as a PDA or a cellular phone.

The present invention is a software compensation method that allows a touch sensitive display to be built using low-cost force sensors based on force sensing resistive material. The method is suitable for use in electronics devices such as cell phones, PDAs, desktop phones, tablets, copy machines, or any other devices that use differential-pressure touch sensitive displays or panels including LCD, Organic Light-Emitting Diode (OLED) display screens or touch pad/touch lens systems. The present method is herein described in the context of a mechanical differential-pressure touch screen system such as illustrated in FIG. 1 that uses a plurality of force sensors (such as, for example, four) differentially-mounted sensors 7 beneath it all connected to the electronic device 1 processor, as disclosed in International application no PCT/US2007/019606 filed 7 Sep. 2007, which application is herein incorporated by reference in its entirety.

Figure 7:
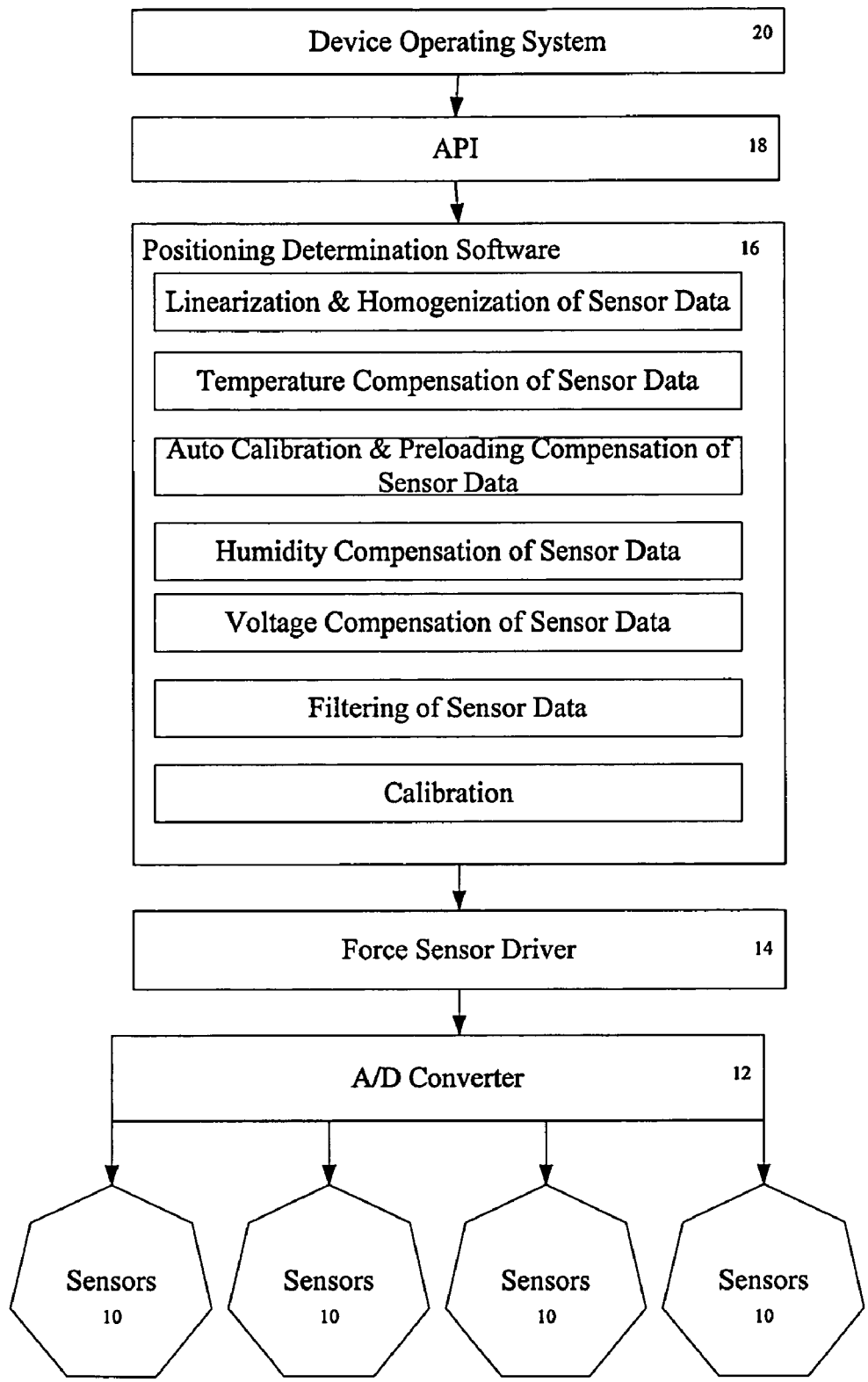
FIG. 7 is a block diagram illustrating the functional flow of the touch screen control software 10 according to the present invention.

FIG. 7 is a block diagram illustrating the functional flow of the touch screen control software 10 according to the present invention. The software includes a sensor driver module 12 for interfacing with the sensor hardware. Sensor driver module 12 includes a voltage conversion function that converts the measured voltage levels from the sensors to force levels. Sensor driver module 12 preferably also includes some level of noise filtering, which can be an issue with piezo resistive force sensors since the output voltage is very low. The software also includes a positioning determination module 14 for determining the position of the touch based on the measured forces and the known locations of the sensors. The calculated coordinates are then provided to the overlaying operating system directly or via an API 16.

This approach does however not work when using force sensing resistors or other low performing low cost force sensor, such as nano-technology-based sensors. These are not linear, they are temperature dependent, and they perform differently from one sensor to the next. Consequently, the between-sensor error is large, typically +/−15% to +/−30% or even greater. In order to position the FSR based sensors as competitive sensor substitutes to piezo-resistive sensors from a performance perspective, multiple factors must be compensated through software. The compensation algorithms must also be small, not consume RAM or ROM, and be fast, not consume much processing power. In accordance with the present software method the positioning determination module 14 performs one or more of the following functions: 1) Linearization & Homogenization of Sensor Data; 2) Temperature Compensation of Sensor Data; 3) Auto Calibration & Preloading Compensation of Sensor Data; 4) Humidity Compensation of Sensor Data; 5) Voltage Compensation of Sensor Data; 6) Filtering of Sensor Data; and 7) Material Calibration of Touchscreen.

1. Linearization & Homogenization of Sensor Data

As discussed above, the FSR sensors are non-linear in their output values. This means that the output value of sensor (typically in mV) does not vary linearly with the actual force applied (see FIG. 3). Due to this non-linearity it cannot be expected that correlation of sensors values will reflect the position and value of force applied on the touch screen correctly. A compensation for this non-linearity is needed in order to force the sensors to show the actual force applied. This requires the following function for calculating the absolute force applied on separate sensor (here in mg) using absolute sensor value as an input variable (in mV).

$$Y = A_n * X^n + A_{n-1} * X^{n-1} + \ldots + A_2 * X^2 + A_1 * X^1 + A_0$$

Where:
X—output value of sensor in mV
Y—calculated value of force in mg
n—degree of polynomial function
An . . . A0—coefficients.

The accuracy of function calculation depends on the degree used in current polynomial function. The higher the degree, the higher the accuracy in calculation and interpolation, but the lower the performance (requiring more processing power, run time memory, and risk of data overflow during runtime). Thus, the selection of the degree is a balanced design choice. Preferably, the user can set the degree from 2 to 9, and suitable degrees are typically 4 to 6.

The coefficients An . . . A0 used in the polynomial function must be determined quantitatively based on actual sample measurements. One suitable known method used for calculating coefficients based on measurements data is the Levenberg—Marquardt method, which requires Sensor calibration data. This data can be stored in a regular text file where each line keeps values of separate measurement sample, where for example, the first number on the line is the force value in mg (x variable of our function) and the second—the output value of sensor. For example:

| Mg: | mV: |
|---|---|
| 80901, | 845 |
| 81002, | 855 |
| 81050, | 862 |

Application of LM is a one time operation which can be implemented in different ways depending on the requirements of the touch screen product and production process. Specifically, the LM procedure reads the calibration data for each sensor, calculates the coefficients for the above polynomial function of each sensor and stores the result to a file.

The Linearization & Homogenization of Sensor Data function loads these coefficients from the file and uses them in runtime in the polynomial function to calculate the force value for each sensor based on raw sensor output in runtime. The compensated values (in mg) are then used by the position determination software 16 for coordinate determination, which coordinates are passed into the touchscreen application programming interface (API) 18.

One skilled in the art should readily understand that the LM coefficient calculation may be integrated into the manufacturing process in various ways. For example, as product is produced a calibration station in the production line may produce a known force at predetermined places on the touch screen. Force and measurements are recorded and the coordinate data file is stored. Alternately, each sensor may be measured during sensor production, or just a few random samples may be measured per production batch and the average coefficients applied to all sensors in the batch.

Figure 8:
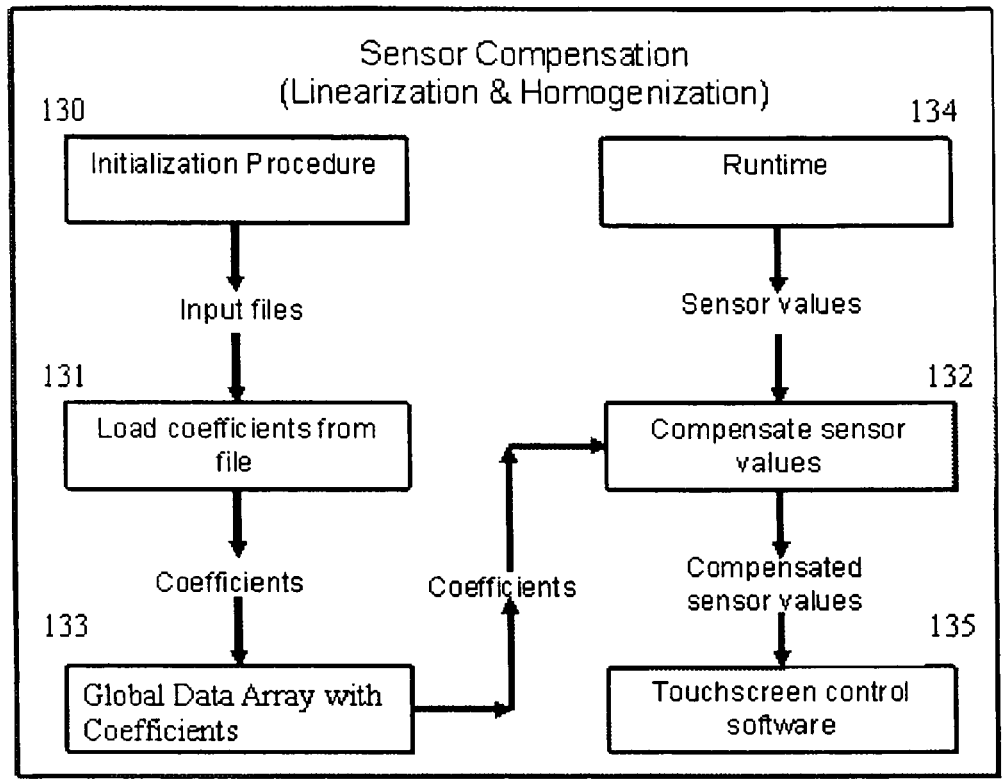
FIG. 8 is a functional block diagram of the Linearization and Homogenization compensation module.

The same homogenization module described above is also capable of adjusting for different sensor 10 designs, thus allowing for the same software to be used for different sensor types. The Linearization & Homogenization of Sensor Data function may be implemented as one executable program containing several embedded functions for initialization and compensation itself. Examples of the functions in the runtime sensor compensation program are provided below:

fsr_compensation_init—this function, 131 is illustrated in the block diagram of FIG. 8. The function loads up coefficients from coefficient output file, 121, for each sensor to use them in the polynomial function. It returns status of operation—flagged a success if all coefficients were loaded and a failure otherwise.

fsr_compensate—this is function 132 in FIG. 8, which takes sensors output values (in mV) as arguments and calculates force values (in mg) of each sensor. It uses internal function lin_function—the implementation of the polynomial function. The degree of the polynomial function is calculated upon amount of read coefficients: degree=coefs_number−1.

If the calculation was successful then input arguments are updated with new values otherwise left without change. This is made to avoid wrong coordinates calculation if compensation failed.

fsr_calc_force_level—this function, indicated by touchscreen control software 135, is used to set levels (for example minimum level for touch sensitivity) in the touchscreen code in mg when compensation is turned on.

The only of the above functions used in runtime is fsr_compensate. Other functions are used only during initialization.

The method described above solves both the linearization, through the conversion of the polynomial curve to a straight line, and the in-between sensor error, through the LM program.

2. Temperature Compensation of Sensor Data

As discussed previously, the performance of the FSR sensors is unfortunately impacted by the surrounding temperature as illustrated in FIG. 5. Studying the FSR sensor behavior more in detail it is clear that the following conclusions are possible:

FSR material is NTC (negative temperature coefficient) type resistor material that performs as a negative temperature coefficient (NTC) resistor, TCR is dependent on force load level Operates both at positive and negative (C) temperature values;

The Temperature Compensation of Sensor Data can be either in hardware or in software, or a combination.

One way to describe the curve of an NTC thermistor is to measure the slope of the resistance versus temperature (R/T) curve at one temperature. By definition, the coefficient of resistance is given by:

$$\alpha = \frac{1}{R} * \frac{dR}{dT}$$

where: T=Temperature in ° C. or K, R=Resistance at Temp T.

Figure 2:
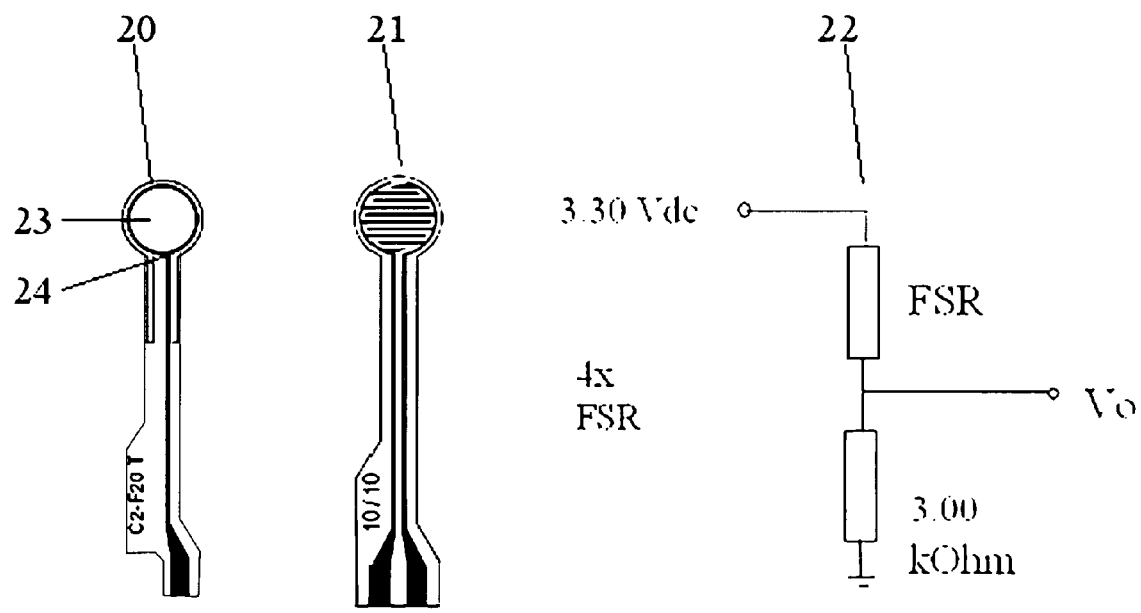
FIG. 2 illustrates two different embodiments of a typical FSR sensor.
Figure 6:
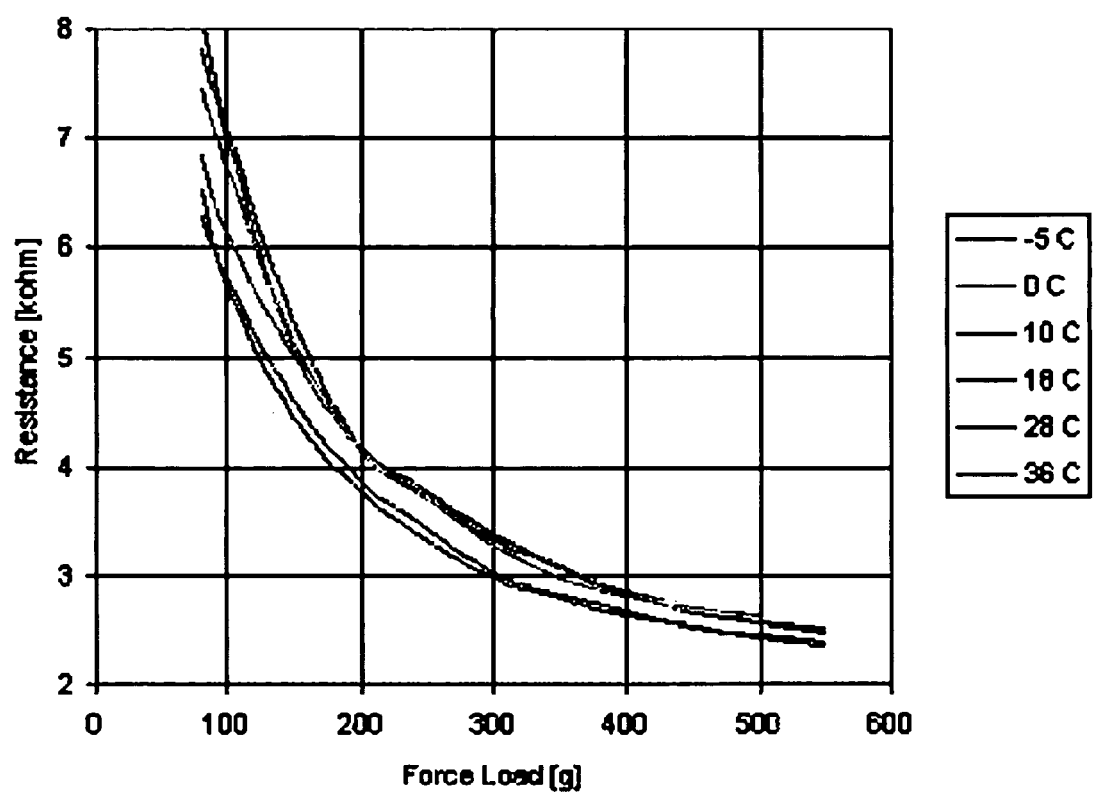
FIG. 6 is a plot illustrating how the resistance-force relationship changes for the same sensor measured under identical conditions, but at different temperature levels.

By using an NTC resistor for the pull-down resistor, 22 FIG. 2, which is matched to the NTC coefficient of the FSR sensor, the temperature dependencies can be eliminated within the existing hardware configuration.

The alternative method for temperature compensation is to apply software compensation to the data from each sensor as shown in the functional block 16 of FIG. 7. The temperature program consists of two main components; temperature conditioning (defining the temperature compensation coefficient) depicted in FIG. 9 and the compensation function of FIG. 10. Defining and recording the temperature coefficient (FIG. 9) can be done completely outside of the runtime software. The FSR sensor used is measured over the appropriate temperature range (145) and the temperature dependent force/voltage data 142 is fed into the coefficient calculation 143. The coefficient is calculated and stored 141 to be used during runtime as described in FIG. 10.

Figure 10:
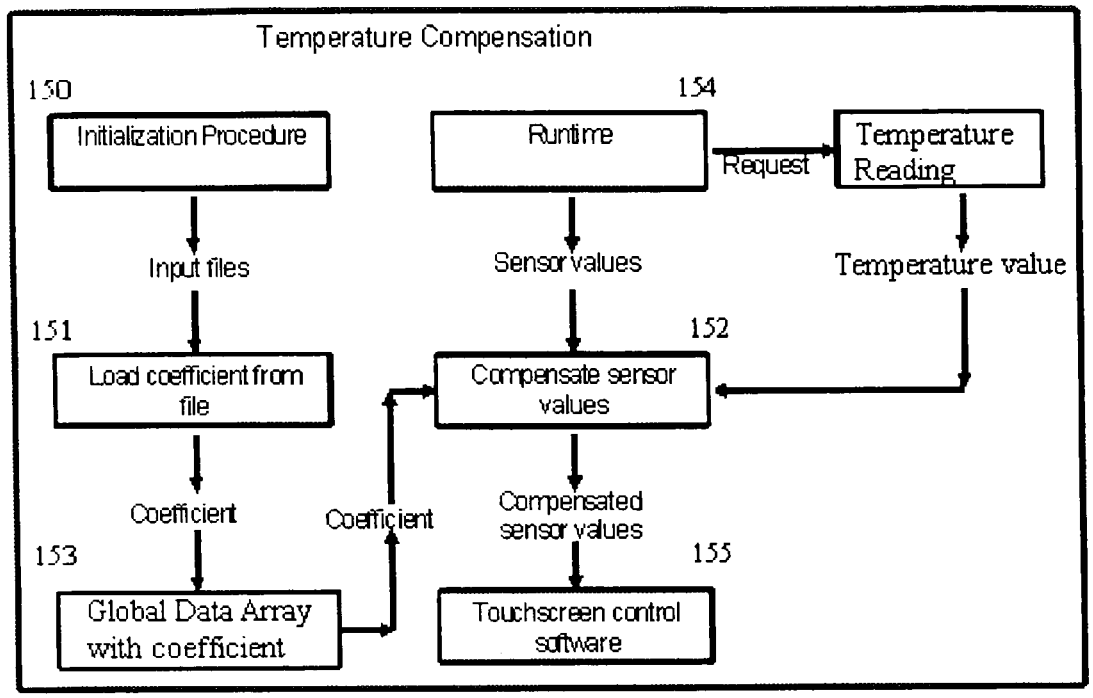
FIG. 10 is a functional block diagram of the temperature compensation function of the temperature compensation module.

For the compensation function of FIG. 10, during runtime the FSR sensor device temperature is read during predefined intervals and/or events and as a temperature change is recorded, the event triggers a recalculation of the sensor compensation value 152 based on the pre-defined sensor temperature coefficient.

3. Auto Calibration & Preloading Compensation of Sensor Data

Figure 11:
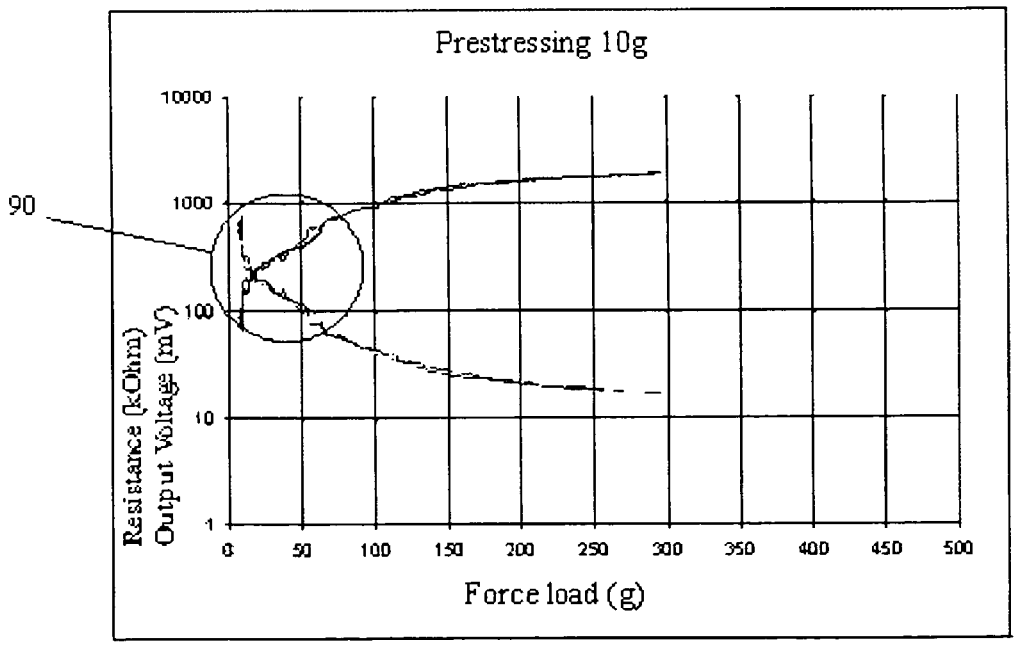
FIG. 11 is a plot of the sensor pre-loading force versus voltage output.

The nature of FSR sensors is that they are non-conductive without an applied force. In order for a sensor to be sensitive for small forces, the sensor must be pre-loaded. This required pre-loading force 90 is described in FIG. 11, where the forces below 75 grams of force provides initially a very low voltage, then a irregular voltage output. As the applied force reaches the 75 gf area, the measured voltage becomes regular and consistent.

Figure 12:
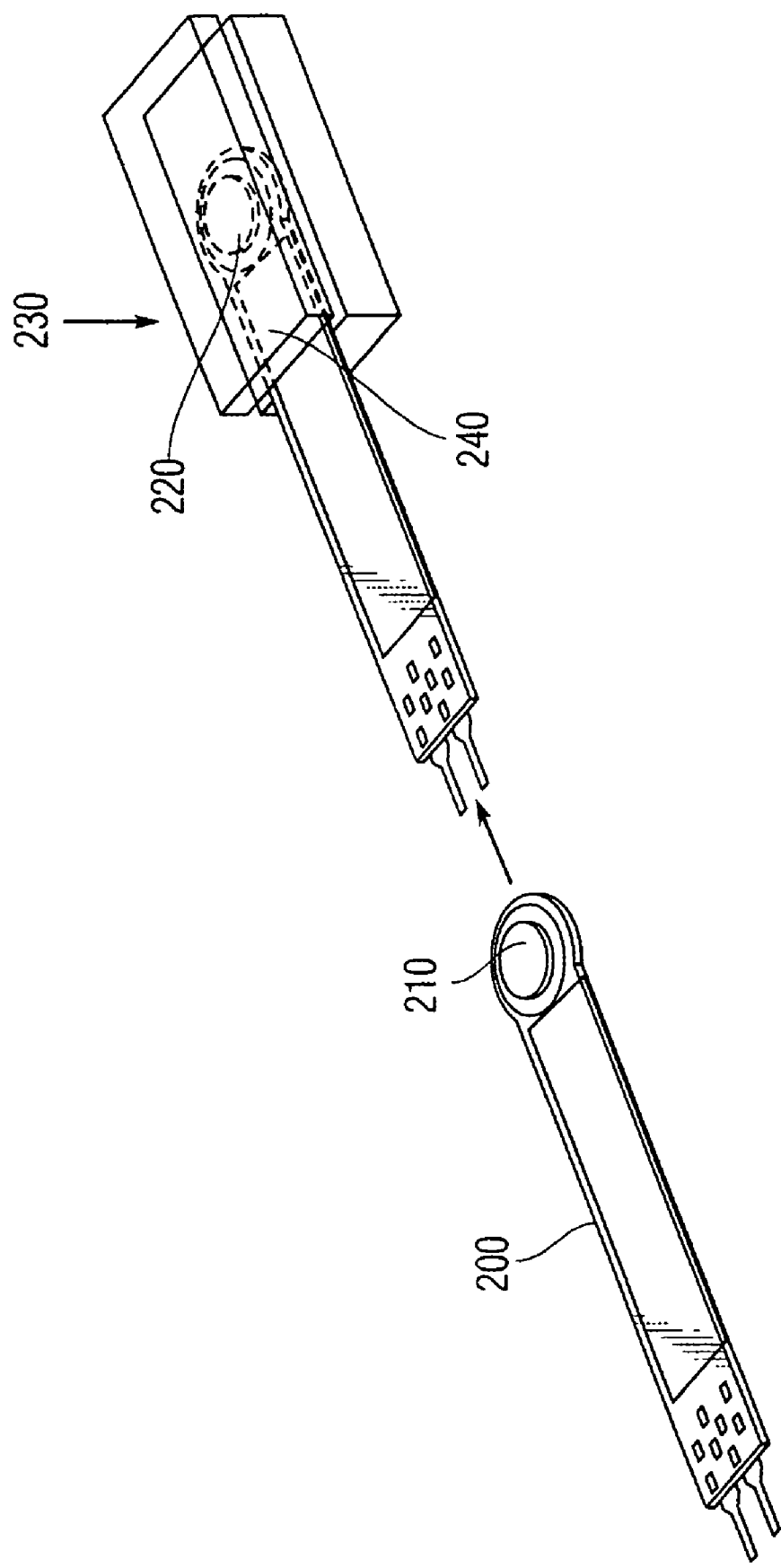
FIG. 12 illustrates how each individual sensor can be mechanically pre-loaded as a part of the sensor structure.

FIG. 12 illustrates how each individual sensor can be mechanically pre-loaded as a part of the sensor structure. A PMMA plastic housing 250 compresses 220 the FSR sensor 200. Part of the pre-loading housing 250 is flexible at 240 in order for the sensor to register and measure any applied force 230. For a commercial implementation, the compression force can be designed into the actual sensor 200 through compressing sensor material or even through the use of adhesive pulling the bottom and top parts of the sensor 200 tight together and thereby compressing the active FSR material within the sensor.

The impact on the touch screen system is that each of the FSR force sensors must be preloaded with a pre-loading force that will differ from sensor to sensor. One negative impact is that as material is aging in the sensor, the measured output will start to drift. For example, where the sensor is pre-loaded with 80 gram force and the sensor output is reset to 0V (interpreted as 0V by the software), over time there will be a change in the pre-loaded (the 0-value) reading and it will no longer be 0V.

Other factors can also affect this 0-value, for example, if the temperature rises and the material around the sensor expands, the force will increase, and the sensor reading will measure an actual sensor load value larger then the 0-value (the specified pre-loading value).

Natural aging of the sensor material will also effect the sensor performance over time and the non loaded value will slowly drift away from 0V.

Figure 13:
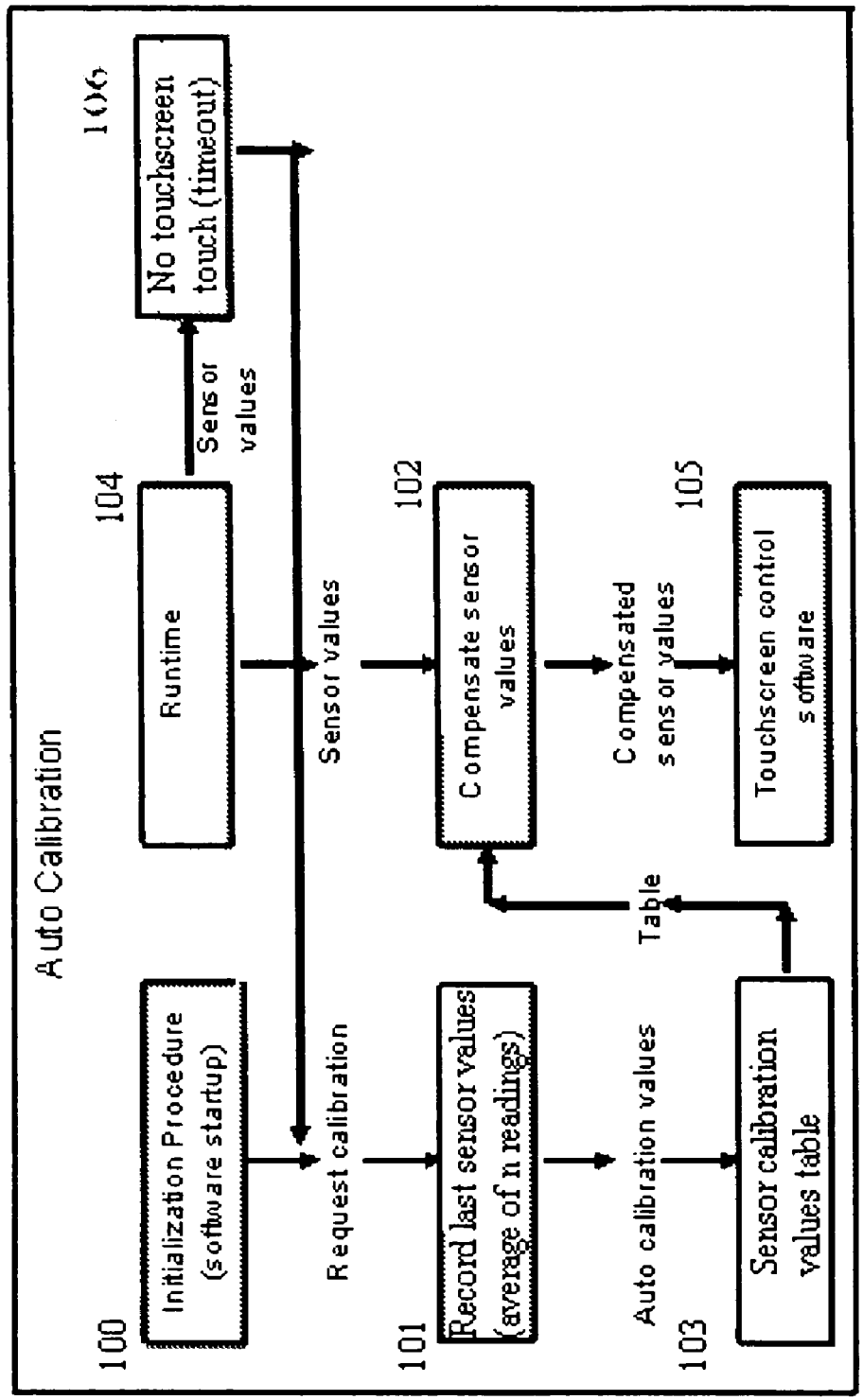
FIG. 13 is a block diagram of the Auto Calibration & Preloading Compensation of Sensor Data module.

In accordance with the present invention, these characteristic of the FSR sensor are filtered out through a continuous auto calibration routine as seen in the functional block 16 of FIG. 7. Specifically, the touch screen control software constantly runs a timer, and when the timer times out before any touch is registered, the last (or average of the last few) sensor reading(s) are used as the new 0-value. This solution is described in more detail in FIG. 13, which comprises the following steps:

At step 106 a Timer Algorithm detects when touch screen has not been touched for a predetermined amount of time. This initiates a calibration request;

At step 101 each sensor is polled and the readings are stored in a FIFO memory queue, or a running average is kept;

At step 103 each sensor's offset values are calculated per sensor calibration;

At step 102 each force sensor reading is corrected by subtracting the corresponding offset value from the sensor reading before using the reading for location calculation The foregoing is repeated iteratively in runtime.

4. Humidity Compensation of Sensor Data

Figure 9:
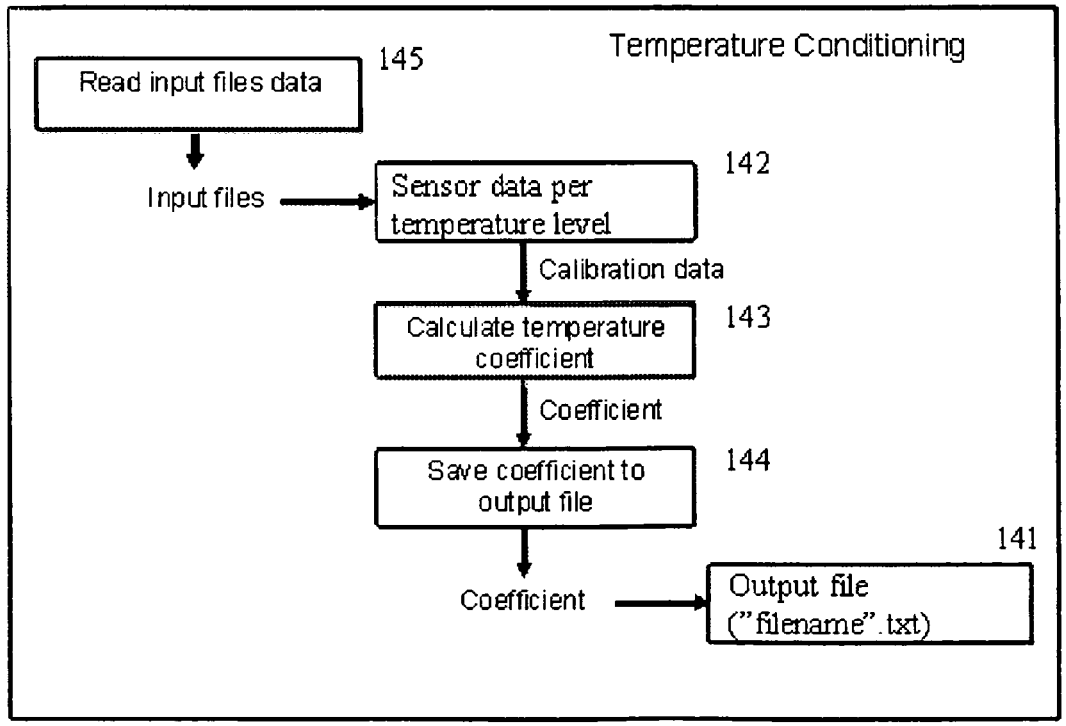
FIG. 9 is a functional block diagram of the temperature conditioning component of the temperature compensation module.

Humidity causes a temperature dependency and sensor error similar to temperature as represented in FIG. 5. Just as for the temperature compensation, the humidity curves can be compensated as shown in the functional block 16 of FIG. 7, using the same type of software method used for the temperature dependence compensation as seen in FIG. 9 & FIG. 10. The system will, however, need to employ the sensors to measure the humidity in order to apply the correct compensation curve.

5. Filtering of Sensor Data

In order to reach an optimal performance, the sensor data must be filtered for unintentional noise as shown in the functional block 16 of FIG. 7. There are typically two components of noise impacting the performance: electrical noise and mechanical noise. Most of the electrical noise can be shielded out or filtered based on measured interfering noise in the system.

The mechanical "noise" is a function of both the sensors being too accurate as well as errors in the readings. In a system without filtering, this can be demonstrated by applying a constant force to a specific touch screen coordinate. The measured coordinate values will move slightly up and down, creating the illusion of jitter. This type of mechanical noise is typically filtered out through averaging the sensor data, for example, by employing a weighted moving average or exponential moving average.

$$WMA_m = \frac{np_m + (n-1)p_{m-1} + \ldots p_{m-n+1}}{n + (n-1) + \ldots 1}$$

6. Material Calibration of Touchscreen

In order to fully compensate for all the different imperfections added to the total touch screen system due to the use of FSR sensors, it is also necessary to review the total mechanical stack-up.

Figure 14:
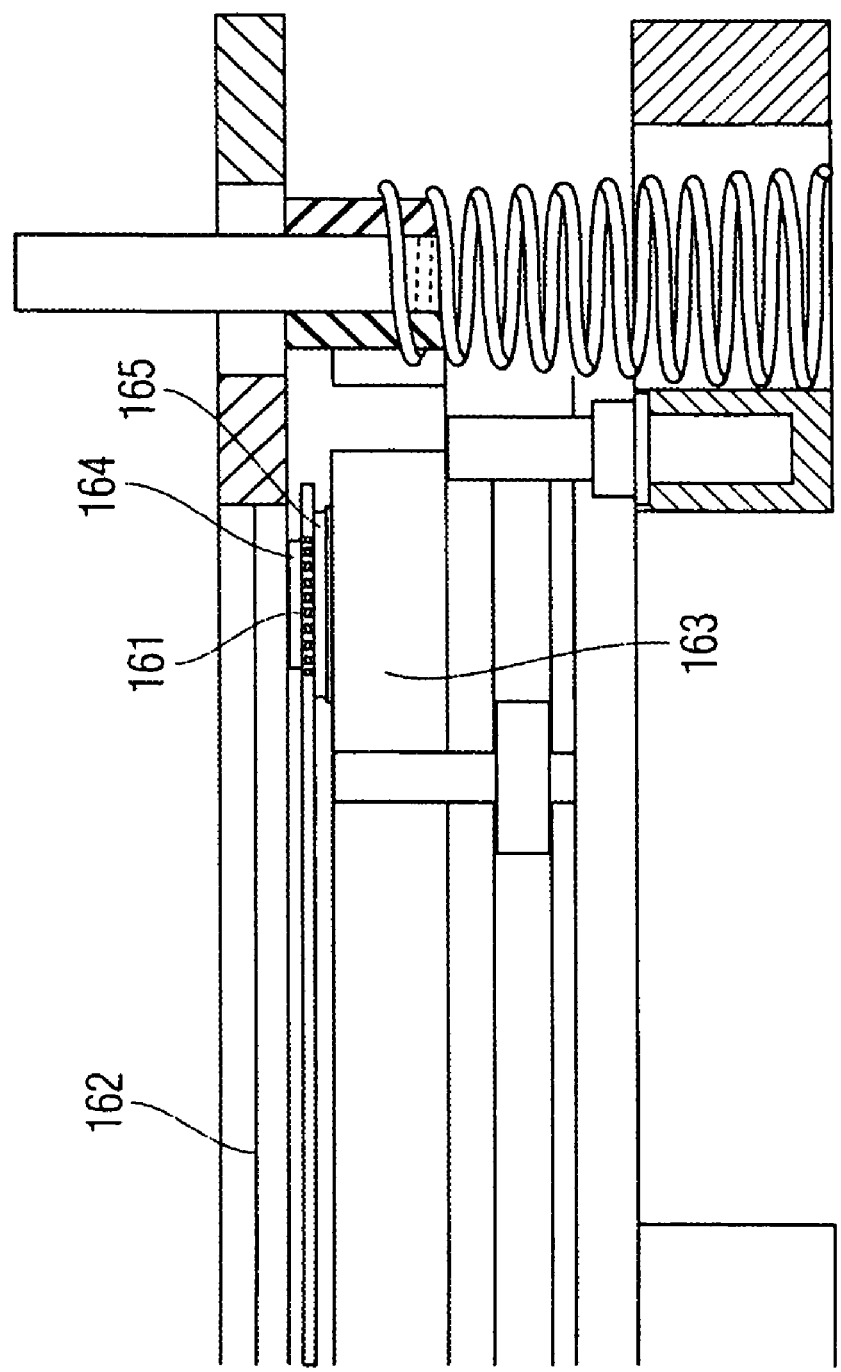
FIG. 14 represents a touch screen system where the FSR sensor 161 is sandwiched between an activator 164 and a Poron™ backing 165.

FIG. 14 represents a touch screen system where the FSR sensor 161 is sandwiched between an activator 164 and a Poron™ backing 165. The activator transfers part of the force applied to the touch screen lens 162, and the Poron™ backing 165 supports the sensor 161 on the rigid cover 163. The diverse components create a disjunctive transmission path for touch force running from the touch screen lens through the sensor 161 down to the cover 163 and this adds non-linear forces and other imperfections which impact the measured force. Moreover, materials such as adhesive between the different components and even dust can add further error into the total system performance. There is therefore a need to apply material compensation as shown in the functional block 16 of FIG. 7 in order to minimize the impact from these small yet unknown and non-linear forces. Note that this material compensation is applicable and appropriate for any force sensor based system independent of sensor type. This compensation is therefore applicable for not only FSR based sensors, but for Piezoresistive or Nanotech based force sensors as well.

The material compensation method applied herein uses a set number of coordinate points on the touch screen (3, 5, 9 or more) where a force is applied. The force may be applied by a tester unit, for example during manufacturing, or directly by the end-user pressing the points as they are displayed through the graphical user interface. An exemplary scenario with 9 calibration points is shown in FIG. 15.

As pressure is applied at each point 174, 177, 178, 179 and the actual is compared to the calculated position of the pressure. In addition, the different force levels are recorded and for each pre-defined point at each predefined force level, the delta values between actual and measured coordinates are recorded.

Figures 15, 16:
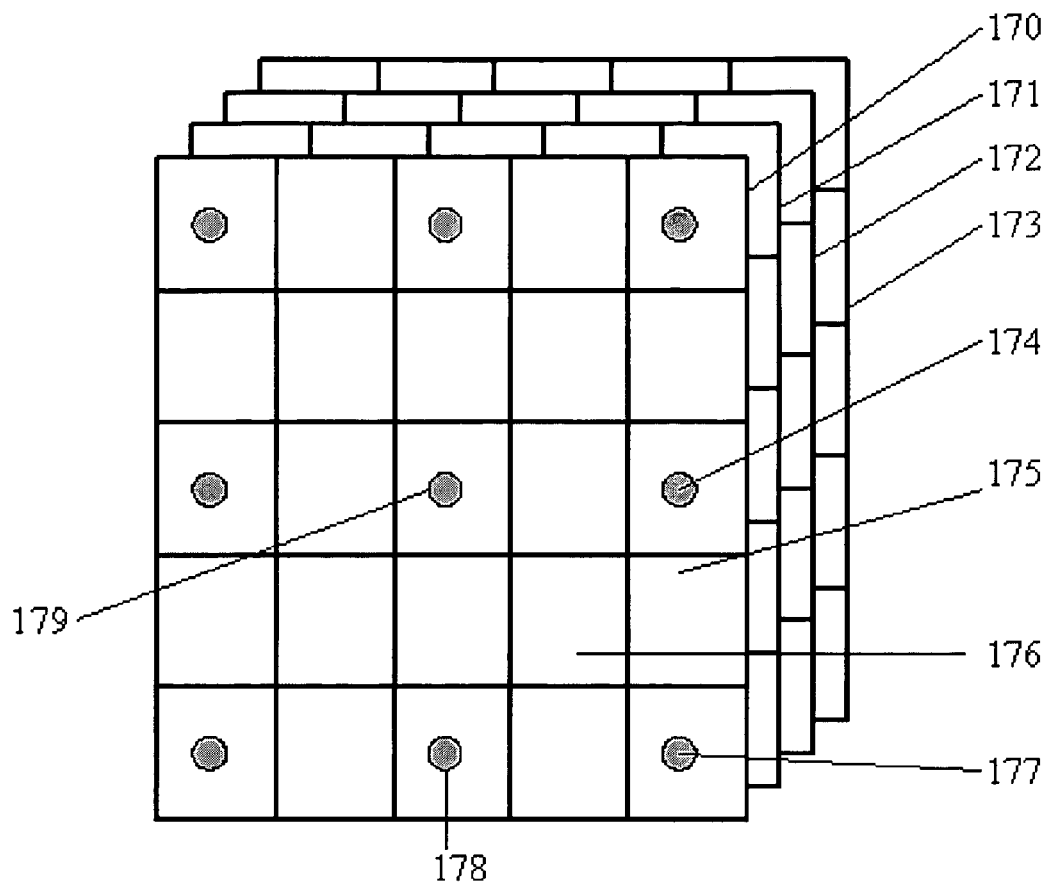
FIG. 15 shows an exemplary nine-calibration point test map.
FIG. 16 is an exemplary compensation data table from the nine-calibration point test map of FIG. 15.

Thus, in FIG. 15, the different force levels are represented by the 3 dimensional grids at calibration points 170, 171, 172 and 173—the compensation actually needs to be applied in a three dimensional grid (or matrix), where the dimensions are x-coordinates, y-coordinates and force levels. The more calibration points and calibration force levels, the better the precision and end result. However, memory and processing requirements are also increased.

The measured delta per calibration point per force level is applied as compensation. In addition, for calibration points that are between points, such as grid 175 and 176, extrapolation is used to calculate these extended grids. The extrapolation typically uses the closest 4 calibration points, but can use more and can add additional weights, especially if the grid is divided into more areas, such as 9 calibration points and 9×9 areas (rather then 5×5 as shown in FIG. 15).

The measured and the extrapolated compensation values per grid area and per force level are recoded in a compensation table as seen in FIG. 16 that may be accessed and applied by the touch screen control software as seen in FIG. 7 anytime a coordinate is calculated and provided to the overlaying operating system.

Note that for a touch that falls between two discrete force levels, the values may be interpolated between the closes layers, where the pressure $p=n*(1-m)+(n+1)*m$;

where; m is the normalized value representing the inversed distance to the closes matched layer.

In order to improve the statistical correctness and to reduce impact from unknown events, such as unfiltered background noise, measuring each point 3 or more times is recommended, but may not be required, especially if the system has a sufficient filtering of background noise and shielding from interference.

It should now be apparent that the above-described control software comprises an array of functional compensation modules including filtering, voltage conversion, sensor calibration, sensor reading linearization, auto calibration, positioning determination and finally end-user and mechanical calibration. The array of compensation modules can bring system accuracy up to an average positioning error below around or even below 1%, which is far better than the average positioning error of 25% to 50%. The increased positioning accuracy makes it possible to use FSRs as opposed to traditional piezoresistive based touch screen sensors.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method for improving touch precision of an electronic device comprising a touch screen having a plurality of differential-force sensors mounted there beneath, a processor in communication with said plurality of differential-force sensors, and memory accessible by said processor, comprising the steps of:
    quantitatively determining coefficients of a polynomial force-resistance equation defining a non-linear force-resistance curve for said plurality of sensors;
    storing said determined coefficients in said memory;
    polling each of said plurality of differential-force sensors for a corresponding raw sensor reading and storing said raw sensor readings in said memory;
    calculating in said processor an actual force value from each of said plurality of differential force sensors using said polynomial force-resistance equation, determined coefficients, and raw force sensor readings, for linearization and homogenization of said raw force sensor readings; and
    calculating in said processor a coordinate position of a force applied to said touch screen based on all of the actual force values calculated for all of said plurality of differential force sensors.

2. The method of claim 1, wherein said plurality of differential-force sensors each comprise a plurality of FSR sensors.

3. The method of claim 1, wherein said plurality of differential-force sensors each comprise a plurality of piezo resistive sensors.

4. The method of claim 1, wherein said plurality of differential-force sensors each comprise a plurality of nano technology-based force sensors.

5. The method of claim 1, wherein said step of quantitatively determining the coefficients of said polynomial force-resistance equation further comprises the sub-steps of determining a temperature compensation coefficient
    for said plurality of sensors, and storing said temperature compensation coefficient, in said memory: and
    said method further comprises the step of
        measuring a temperature of each of said plurality of sensors:
        calculating in said processor a temperature compensation value for temperature compensation of sensor data; and
        said step of calculating in said processor an actual force value from each of said plurality of differential force sensors further comprises using said temperature compensation value in said polynomial force-resistance equation.

6. The method of claim 5, wherein said method further comprises the steps of
    determining by said processor that no force is applied to said touch screen;
    polling each of said plurality of sensors and recording a sensor output reading for each in said memory;
    calculating by said processor a a sensor offset value for auto calibration and preloading compensation of sensor data; and
    said step of calculating in said processor an actual force value from each of said plurality of differential force sensors further comprises using said sensor offset value in said polynomial force-resistance equation.

7. The method of claim 6, wherein said step of quantitatively determining the coefficients of said polynomial force-resistance equation further comprises the sub-steps of determining a humidity compensation coefficient for said plurality of sensors, and storing said humidity compensation coefficient in said memory; and
    wherein said method further comprises the step of
        measuring ambient humidity proximate to said plurality of sensors;
        calculating by said processor a a humidity compensation value for humidity compensation of sensor data; and
        said step of calculating in said processor an actual force value from each of said plurality of differential force sensors further comprises using said humidity compensation value in said polynomial force-resistance equation.

8. The method of claim 7, wherein said step of calculating in said processor an actual force value from each of said plurality of differential force sensors further comprises conversion of said raw sensor readings in said memory from measured voltage levels to force levels.

9. The method of claim 8, wherein said step of polling each of said plurality of differential-force sensors for a corresponding raw sensor reading further comprises a substep of storing said raw sensor readings in said memory in a queue along with prior sensor readings, and maintaining in said memory a moving average of said raw sensor readings for filtering of sensor data noise; and
    said step of calculating in said processor an actual force value from each of said plurality of differential force sensors further comprises using said moving average.

10. The method of claim 9, wherein said method further comprises the step of calibrating said touch screen, said calibration step further comprising the sub-steps of
    applying at one or more predetermined coordinate positions of said touch screen a calibration force:
    calculating a coordinate position of said applied calibration force;
    comparing said calculated coordinate positions and said predetermined coordinate positions and calculating by said processor a coordinate position compensation value for material calibration of said touch screen; and
    recording said coordinate position compensation value in said memory; and
    said step of calculating in said processor a coordinate position of a force applied to said touch screen based on all of the actual force values calculated for all of said plurality of differential force sensors further comprises applying said coordinate position compensation value to the determined coordinate position.

11. The software method of claim 1, wherein said polynomial force-resistance equation comprises the following function:

$$Y = A_n * X^n + A_{n-1} * X^{n-1} + \ldots + A_2 * X^2 + A_1 * X^1 + A_0$$

X is an output value of the sensor;
Y is a calculated value of force in mg;
n is a degree of polynomial function; and
An . . . A0 are predetermined coefficients.

12. A differential-force touch screen display for a portable electronic device having improved touch precision, comprising:
- a display module having a touch panel;
- a plurality of FSR force sensors in operative contact with said touch panel;
- a processor in communication with said FSR force sensors, said processor having accessible memory containing predetermined coefficients of a sensor-specific force-resistance curve for each of said plurality of FSR force sensors;
- a software program resident in said accessible memory and executable by said processor, said software program comprising a module for linearization and homogenization of sensor data using a sensor-specific force-resistance curve for each of said plurality of FSR force sensors;
- whereby an actual force experienced by each of said plurality of FSR force sensors is calculated by said software program applying said predetermined coefficients retrieved from said accessible memory to said sensor-specific force-resistance curve for each of said plurality of FSR force sensors.

13. The differential-force touchscreen display of claim 12, further comprising at least one temperature sensor in communication with said processor; and
- wherein said software program further comprises a module for temperature compensation of sensor data whereby a temperature compensation value is calculated based on a temperature measured by said temperature sensor and applied to said calculation of the force experienced by each said FSR force sensor.

14. The differential-force touchscreen display of claim 12, wherein said software program further comprises a module for auto calibration and preloading compensation of sensor data whereby upon determining that no force is applied to said touch screen, each said FSR force sensor is polled and a sensor offset value calculated for each sensor; said sensor offset value thereafter applied to said calculation of the force experienced by each said sensor.

15. The differential-force touchscreen display of claim 12, further comprising at least one humidity sensor in communication with said processor; and wherein said software program further comprises a module for humidity compensation of sensor data whereby a humidity compensation value is calculated based on an ambient humidity measured by said humidity sensor and applied to said calculation of the force experienced by each said FSR force sensor.

16. The differential-force touchscreen display of claim 12, wherein said software program calculates an actual force value from each of said plurality of FSR sensors by conversion of raw sensor readings from measured voltage levels to force levels.

17. The differential-force touchscreen display of claim 12, wherein said software program further comprises a module for filtering of sensor data noise whereby a moving average of said received electrical signals is calculated for use as a basis for calculation of the force experienced by each said FSR force sensor is calculated based.

18. The differential-force touchscreen display of claim 12, wherein said software program further comprises a module for material calibration of said touchscreen whereby a calibration force is applied to one or more predetermined coordinate positions of said touch panel and a coordinate position calculated there from, and wherein said calculated position is compared to said predetermined position to calculate a coordinate position compensation value.

19. The differential-force touchscreen display of claim 12, wherein said display module is selecting from among the group comprising an LCD display module, an OLED display module, a touch lens module and touch pad module.

20. The differential-force touchscreen display for a portable electronic device of claim 12, further comprising:
- a plastic housing enveloping said FSR force sensor and maintaining operative contact with said display module, said plastic housing imparting a compressive preload on said force sensor.

* * * * *